(12) United States Patent
Wang

(10) Patent No.: US 12,307,023 B2
(45) Date of Patent: May 20, 2025

(54) CHINESE CHARACTER INPUT METHOD AND SYSTEM AND KEYBOARD

(71) Applicant: John Zhongqi Wang, Bellevue, WA (US)

(72) Inventor: John Zhongqi Wang, Bellevue, WA (US)

( * ) Notice: Subject to any disclaimer, the term of this patent is extended or adjusted under 35 U.S.C. 154(b) by 120 days.

(21) Appl. No.: 17/970,572

(22) Filed: Oct. 21, 2022

(65) Prior Publication Data
US 2024/0184381 A1 Jun. 6, 2024

(51) Int. Cl.
G06F 3/023 (2006.01)
G06F 3/04845 (2022.01)

(52) U.S. Cl.
CPC ........ G06F 3/0233 (2013.01); G06F 3/04845 (2013.01)

(58) Field of Classification Search
CPC ..... G06F 3/018; G06F 3/0233; G06F 3/04895
See application file for complete search history.

(56) References Cited

U.S. PATENT DOCUMENTS

| 4,684,926 A | * | 8/1987 | Yong-Min | G06F 3/018 382/243 |
| 2020/0104043 A1 | * | 4/2020 | Huang | G06F 3/04886 |

* cited by examiner

Primary Examiner — Priyank J Shah

(57) ABSTRACT

The invention discloses a Chinese character input method and system and a keyboard, and relates to the technical field of computers. A specific embodiment of the method includes: recognizing the received key signal; in the case that the recognition result of the received key signal is indicated as a Chinese character category code and/or a phrase category code, determining the recognized Chinese characters and/or phrases represented by Chinese character category code and/or the phrase category code; wherein, the Chinese character category code, used to represent Chinese character, is the combination of the component category code corresponding to the basic components included in the Chinese character or the combination of the component category code and the distinguishing code, which is the code corresponding to the distinguishing components obtained after the basic component is split; the phrase category code, for representing the phrase, is the combination of all or part of the Chinese character category code of each Chinese character that the phrase includes; display the determined Chinese characters and/or phrases. This embodiment solves the problem of cluttered characters, and the whole input process is very natural, which reduces the difficulty of learning, the repetition rate is low, and the input speed is fast.

13 Claims, 13 Drawing Sheets

Identify the received key signal. — S101

In the case where the recognition result of the received key signal is indicated as the Chinese character category code and/or the phrase category code, determine the Chinese character and/or phrase represented by the recognized Chinese character category code and/or the phrase category code; wherein, the Chinese character category code, used to represent the Chinese character, is the combination of the component category code corresponding to the basic components included in the Chinese character or the combination of the component category code and the distinguishing code, which is the code corresponding to the distinguishing components obtained after the basic component is split; the phrase category code, for representing phrase, is the combination of all or part of the Chinese character category code of each Chinese character that phrase includes. — S102

Display the determined Chinese characters and/or phrases. — S103

Figure 2

| | | | | | |
|---|---|---|---|---|---|
| 人 A | 人 | 金,食,虫 | 口 O | 口 | 凸,石,言 |
| | 尹 | 妻 | | 中 | 串,患,虫 |
| 彐 D | 彐 | 月,隶,事 | | 囲 | 黑,熏 |
| | 尹 | 失 | | 束 | 中,束 |
| | 隶 | 聚 | 卩 P | 卩 | 卩 |
| | 廴 | 市 | | 力 | 月,ω |
| | 聿 | 市 | | 力 | 为 |
| 仁 E | 王 | 王 | 田 Q | 甲 | 甲,果,里 |
| | 耳 | 亚,耳,卅,廿,专 | | 田 | 中,虫,束,重 |
| 厂 F | 厂 | 疒,严 | | 曲 | 曲,血 |
| ム G | ム | 云,長,夕 | | 毋 | 母,毋 |
| | 亾 | 长,彡 | 尸 R | 尸 | 久,及,乃 |
| | 纟 | 糸 | | 尤 | 尤,旡,癶 |
| 一 H | 一 | 世,万,瓦 | 丅 S | 五 | 书,韦 |
| 丨 I | 丨 | 少,川,上,业,本 | | 歹 | 歹,歺,夕 |
| 丿 J | 丿 | 片,身 | | 勹 | 勺,丐,丏,勹,事 |
| | 力 | 乂 | | 弓 | 弓,弗 |
| | 匚 | 弓,巳,卩 | 丅 T | 丁 | 乎,牙 |
| | 广 | 年,气 | 八 V | 八 | 门,兆,瓜,承 |
| 十 K | 十 | 十,革,垂,缶,毛 | | 儿 | 兆,川 |
| | 土 | 艹 | | 小 | 示,乐,东,枣 |
| L L | L | 乚 | | 川 | 州 |
| | 飞 | 飞 | 义 X | 义 | 爻,龖,※ |
| | 七 | 屯,严,龙,氏,民,长,弋 | | 支 | 支 |
| 本 M | 永 | 求,永,承 | | 文 | 文,父,皮 |
| | 釆 | 釆 | | 尹 | 户 |
| | 豕 | 豸,象 | | ∨ | Y |
| 口 N | 口 | 内,且,曲,禹,隹,南,甫 | | 宀 | 宀 |
| | 舟 | 舟 | | 亠 | 方,亡,立,衣 |
| | 内 | 肉,两 | | | |
| | 而 | 柬 | | | |

Figure 8

| | | | | | |
|---|---|---|---|---|---|
| A | 入 | 入 | L L | 七 | 七,七 |
| | 太 | 犬,夫,夬 | | 七 | 七 |
| | 夹 | 夬 | | 包 | 包 |
| 日 B | 日 | 日,曰,冃 | | 必 | 必 |
| | 白 | 白 | | 己 | 己,巳,已 |
| | 目 | 且,且 | 木 M | 木 | 木 |
| | 昌 | 鳥 | | 水 | 水,氺 |
| 彐 D | 彐 | 彐 | | 末 | 末,未 |
| | 王 | 王 | | 瓜 | 瓜 |
| | 尹 | 尹,尹 | | 豕 | 豕 |
| | 艮 | 艮 | 門 N | 門 | 月,门,門 |
| 匚 E | 王 | 王 | | 月 | 月 |
| | 毛 | 毛 | 口 O | 口 | 口 |
| | 手 | 手 | | 吏 | 吏 |
| | 丰 | 丰,肀 | | 两 | 西,酉 |
| | 業 | 羊,羊 | | 皿 | 皿 |
| | 丰 | 丰,方 | 卩 P | 卩 | 卩,卪 |
| | 井 | 井 | | 尸 | 尸 |
| 厂 F | 厂 | 厂 | 田 Q | 田 | 田 |
| | 斤 | 斤 | | 甲 | 由 |
| 厶 G | 乡 | 乡 | | 电 | 电 |
| | 幺 | 幺 | 尺 R | 尺 | 八 |
| 一 H | 广 | 广 | 刁 S | 刁 | 刁 |
| | 一 | 廾 | | 乙 | 一 |
| | 冊 | 冊,冊 | | 又 | 又,义 |
| | 瓦 | 开 | | 勹 | 勹 |
| | 甘 | 甘 | | 习 | 习 |
| 丨 I | 且 | 且,刂 | | 鸟 | 鸟 |
| | 卜 | 卜 | 丁 T | 丁 | 丁 |
| | 斗 | 斗 | | 子 | 子,孑 |
| | 止 | 止,辶 | | 予 | 矛 |
| 丿 J | 刀 | 月,刀 | 八 V | 小 | 小 |
| | 夕 | 夕 | | 灬 | 灬 |
| | 氏 | 氐 | | 巛 | 巛 |
| | 九 | 丸 | | 小 | 小 |
| | 竹 | 竹 | 乂 X | 戊 | 戊 |
| 十 K | 士 | 士 | | 戈 | 戈,戈 |
| | 牛 | 牛 | | | |

Figure 9

|   | A | B | C | D | E | F | G | H | I | J | K |
|---|---|---|---|---|---|---|---|---|---|---|---|
| A | 食 | 羹 |   |   |   |   |   |   |   |   |   |
| B | 貝 | 見 | 凸 | 甲 |   |   |   |   |   |   |   |
| C | 臣 |   |   |   |   |   |   |   |   |   |   |
| D | 司 | 事 | 丰 | 圭 | 串 |   |   |   |   |   |   |
| E | 王 | 亞 | 罒 | 亙 | 尸 |   |   |   |   |   |   |
| F |   |   |   |   |   |   |   |   |   |   |   |
| G | 糸 |   |   |   |   |   |   |   |   |   |   |
| H | 廿 | 卅 | 無 | 巛 | 冊 | 串 |   |   |   |   |   |
| I | 耂 | 上 | 五 |   |   |   |   |   |   |   |   |
| J | 乂 | 长 | 月 | 亐 | 方 |   |   |   |   |   |   |
| K | 半 |   |   |   |   |   |   |   |   |   |   |
| L | 勹 | 毛 | 心 | 龍 | 巨 | 電 | 龜 | 飛 |   |   |   |
| M | 來 | 朿 | 乘 | 乘 |   |   |   |   |   |   |   |
| N | 月 | 冃 | 舟 | 币 | 冏 | 內 | 田 | 門 | 門 | 而 | 兩 |
| O | 垂 | 華 | 夷 | 非 | 兩 | 隶 |   |   |   |   |   |
| P | 戶 | 尸 | 巴 | 刃 |   |   |   |   |   |   |   |
| Q | 重 | 垂 | 夾 | 東 | 電 | 更 | 畢 | 市 | 曲 |   |   |
| R | 矢 | 央 | 允 | 尤 |   |   |   |   |   |   |   |
| S | 烏 | 鳥 | 亏 | 与 | 馬 | 勻 | 為 | 爲 |   |   |   |
| T | 丁 |   |   |   |   |   |   |   |   |   |   |
| U |   |   |   |   |   |   |   |   |   |   |   |
| V | 噩 | 噩 | 亞 | 那 | 那 | 門 | 門 | 冊 | 無 | 廿 |   |
| W |   |   |   |   |   |   |   |   |   |   |   |
| X | 疋 | 乐 | 攵 | 戈 |   |   |   |   |   |   |   |
| Y | 糸 | 乁 | 乀 |   |   |   |   |   |   |   |   |

Figure 10

Component Input Method

Learn Component Input Method through 10 exercises

[Please make sure your computer/phone is under English input mode. Recommend Chrome browser.]

1. Learn Component-key pairings
2. Give it a try
3. Learn Expanded Components
4. Review Expanded Components
5. Practice Expanded Components
6. Learn Attached Components
7. Learn Twin Components
8. Characters with single Component
9. Characters with two Components
10. General Exercises

[Optional] Customized typing exercises

Free typing and help

Figure 11

CHINESE CHARACTER INPUT METHOD AND SYSTEM AND KEYBOARD

TECHNICAL FIELD

The invention relates to the technical field of computers, in particular to a method and system for inputting Chinese characters and a keyboard.

BACKGROUND TECHNIQUE

Chinese character input methods are divided into shape code, sound code, handwriting and phonetic input methods from the large categories. Wubi font input method is currently the most used shape code input method. Because the Wubi font input method is a relatively early shape input method, there is no standard for character splitting, so it is relatively messy and does not conform to the word theory. In addition, its various rules are very complex and difficult to learn. Sound coding is input into the computer according to the pronunciation of Chinese characters. At present, the most commonly used method is the Chinese Pinyin input method. Its repetition rate is too high, and the user is always in the process of constantly selecting words, the input speed is slow, and the unfamiliar words cannot be input. The handwriting input method is to input directly on the input terminal by hand or an electronic pen. The voice input method is to speak directly to the machine, which is translated by software and hardware, which requires high pronunciation accuracy, as well as high hardware and software equipment requirements.

In the process of realizing the present invention, the inventor found that there are at least the following problems in the prior art:

The split words are messy and not in line with the wording, the rules are very complicated, the learning is difficult, the repetition rate is high, the input speed is slow, and the requirements for pronunciation and equipment conditions are high.

SUMMARY OF THE INVENTION

In view of this, the embodiment of the present invention provides a Chinese character input method and system and a keyboard, which can input Chinese characters only based on component code, without combining other factors, the input is simple and convenient, solves the problem of cluttered characters, conforms to wording, and is easy to use, and does not require special learning. The entire input process is very natural, without many rules, which reduces the difficulty of learning, the repetition rate is low, the input speed is fast, and there are no special requirements for pronunciation and equipment conditions.

In order to achieve the above object, according to one aspect of the embodiment of the present invention, a method for inputting Chinese characters is provided, comprising: identify the received key signal; in the case where the recognition result of the received key signal is indicated as the Chinese character category code and/or the phrase category code, determine the Chinese character and/or phrase represented by the recognized Chinese character category code and/or the phrase category code; wherein, the Chinese character category code, used to represent the Chinese character, is the combination of the component category code corresponding to the basic components included in the Chinese character or the combination of the component category code and the distinguishing code, which is coding of the corresponding distinguishing components obtained after the basic component is split; the phrase category code, for representing phrase, is the combination of all or part of the Chinese character category code of each Chinese character that phrase includes; the identified Chinese characters and/or phrases are displayed.

Optionally, identifying the received key position signal includes: whether the key position signal of reserved key position is included in the key position signal of identification, if the key position signal of described reserved key position is not included, then the identification result of the key position signal received is indicated as Chinese character category code and/or phrase category code.

Optionally, identifying the received key position signal also includes a reserved key signal, and the first key signal in the received key signal is a reserved key signal, then the received identification result of the signal is indicated as a Pinyin input signal, wherein the key position signal corresponding to the key position input after the reserved key position is identified as the Pinyin, and then the Chinese character or phrase corresponding to the Pinyin is displayed. In this way, the switching between Pinyin input and component input can be realized based on reserved key positions, and at the same time, Pinyin can be used to reverse look up and display the category code of Chinese characters or phrases, and learn while using them.

Optionally, determine the Chinese character and/or phrase represented by the Chinese character category code and/or the phrase category code of identification, including: According to the key combination corresponding to the received key signal, search the Chinese character category code and the phrase category code that are consistent with the key combination in the Chinese character category input method table and the phrase category input method table, respectively, and determine the found Chinese character and/or phrase represented by Chinese character category code and/or phrase category code, wherein, in the Chinese character category input method table, the correspondence between the Chinese character and the Chinese character category code is recorded, and in the phrase category input method table, the correspondence between the phrase and phrase category code is recorded.

Optionally, the method also includes: pre-generating the Chinese character category code of each Chinese character to obtain the Chinese character category input method table, wherein the Chinese character category code of the Chinese character is generated by the following manner: determine the number of components of the Chinese character to be generated Chinese character category code, the number of components is the number of basic components included in the Chinese character, and the basic components of the Chinese character are ordered; if the number of components is 1, the unique basic component of the Chinese character is split to obtain a plurality of ordered distinguishing components, and according to the component category code of the unique basic component of the Chinese character and the corresponding distinguishing code of the first two distinguishing components, generate the Chinese character category code of described Chinese character; if the number of components is 2, the second basic component of the Chinese character is split to obtain a plurality of ordered distinguishing components, and according to the component category code of the two components and the distinguishing code of the first two distinguishing components, generates the Chinese character category code of the described Chinese character; if the number of components is greater than or equal to 3, the Chinese character category code of the Chinese character is generated according to the component category code of all basic components of the Chinese character.

Optionally, the component category code is generated in the following manner: classify all basic components according to their shapes, and obtain multiple basic component shape categories; in each basic component shape category, a basic component that conforms to the specified rule is used as the category guide component of the basic component shape category; according to the shape similarity between the category guide components and the capital letters, a component category code corresponding to each basic component shape category is determined.

Optionally, the method further includes: according to the component category code corresponding to each basic component shape category, establish a matching relationship between the basic component shape category and the key position; and, in response to the user's input instruction, display a virtual keyboard among a variety of virtual keyboards, the virtual keyboard includes a plurality of virtual keys, the virtual keys are in one-to-one correspondence with the key positions, and the virtual keys are used to display to the user some or all of the basic components in the basic component shape categories matching the corresponding key positions, and the various virtual keyboards can be switched to each other based on the user's selection instruction, and the basic component shape categories correspond to the key positions one-to-one.

Optionally, the virtual keys are used to group and show some or all of the basic components in the shape category of the basic components matched with the corresponding key positions according to the shape similarity between the basic components.

Optionally, the distinguishing code is generated in the following manner: for each distinguishing component, determine whether it's a basic component; if yes, then determine the distinguishing cod of the distinguishing component corresponding to the component category code of the basic component; if not, determine the similarity between the distinguishing component and all the basic components, and get the distinguishing code of the distinguishing component from the component category code of the closest basic component.

Optionally, all the basic components include basic components for generating simplified Chinese characters, traditional Chinese characters, Chinese characters in Japanese, and Chinese characters in Korean.

Optionally, the method further includes: pre-generating the phrase category code of each phrase to obtain the phrase category input method table, wherein the phrase category code of the phrase is generated in the following manner: determine the Chinese character category code of each Chinese character that the phrase to be generated is comprised of; according to the number of encodings of the Chinese character category code of each Chinese character in the set phrase category code, and according to the sequence of encoding in the Chinese character category codes, extract the equal number of encoding from the Chinese character category code of each Chinese character included in the phrase; and according to the order combination of Chinese characters in the phrase, the phrase category code of the phrase is obtained; or, the Chinese character category code of each Chinese character that the phrase includes is combined to obtain the phrase category code of the phrase.

Optionally, displaying the determined Chinese characters and/or phrases includes: sequentially displaying the determined Chinese characters and/or phrases according to the frequency of use of the determined Chinese characters and/or phrases.

Optionally, the method also includes: in the case where the recognition result of the received key signal is indicated as the sentence category code, display the determined sentence; wherein, the set sentence category code consists of complete Chinese character category code and/or phrase category code of at least one continuous Chinese character and/or phrase.

According to another aspect of the embodiments of the present invention, a system for inputting Chinese characters is provided, comprising: a key signal recognition module for recognizing received key signals; a Chinese character and phrase determination module for determining the Chinese character and/or the phrase represented by the identified Chinese character category code and/or the phrase category code when the identification result of the bit signal is indicated as the Chinese character category code and/or the phrase category code; the combination of the corresponding category code of the basic component or the combination of the component category code and the distinguishing code is used to represent Chinese characters, and the distinguishing code is the corresponding coding of the distinguishing components obtained after the basic component is split; the phrase category code, used to represent the phrase, is the combination of all or part of the Chinese character category codes of each Chinese character included in the phrase; the display module is used to display the determined Chinese character and/or phrase.

According to another aspect of the embodiments of the present invention, there is provided a keyboard for inputting Chinese characters based on the Chinese character input method provided in one aspect of the embodiments of the present invention, comprising: keys matching key positions corresponding to the component category code and the distinguishing code, and key matching with reserved key position, the keyboard generates corresponding key position signals according to the user's key operation.

According to another aspect of the embodiments of the present invention, there is provided an electronic device for inputting Chinese characters, including: one or more processors; and a storage device for storing one or more programs, when the one or more programs are executed by one or more processors, the one or more processors implement the Chinese character input method provided by the embodiment of the present invention.

According to another aspect of the embodiments of the present invention, a computer-readable medium is provided, and a computer program is stored thereon, and when the program is executed by a processor, the method for inputting Chinese characters provided by the embodiments of the present invention is implemented.

An embodiment in the above-mentioned invention has the following advantages or beneficial effects: by identifying the received key signal; under the situation that the identification result of the received key signal is indicated as the Chinese character category code and/or the phrase category code, determine the Chinese character category code and/or the phrase category code represented by the identified Chinese character category code and/or phrase; wherein, the Chinese character category code, used to represent Chinese characters, is the combination of the component category code corresponding to the basic components that the Chinese character includes or the combination of the component category code and the distinguishing code, which is the code corresponding to the distinguishing components obtained after the basic component is split; the phrase category code is the combination of all or part of the Chinese character category codes of each Chinese character that the phrase includes, for representing the phrase; the technical solution for Chinese characters and/or phrases can be used to input Chinese characters only based on component codes, no need to combine other factors, the input is simple and convenient, solves the problem of cluttered characters, conforms to wording, easy to remember and use, and does not require special learning, the whole input process is very natural, there are not many rules, which reduces the difficulty of learning, the repetition rate is low, the input speed is fast, and there are no special requirements for pronunciation and equipment conditions.

Further effects of the above non-conventional alternatives will be described below in conjunction with specific embodiments.

DESCRIPTION OF DRAWINGS

The accompanying drawings are used for better understanding of the present invention and do not constitute an improper limitation of the present invention. In:

FIG. 2 is a schematic diagram of a Chinese character basic component shape code table according to an embodiment of the present invention;

FIG. 8 is a schematic diagram of attached components of an embodiment of the present invention;

FIG. 9 is a schematic diagram of twin components of an embodiment of the present invention;

FIG. 10 is the traditional Chinese character and Japanese-Korean Chinese character component shape code table schematic diagram of an embodiment of the present invention;

FIG. 11 is a schematic diagram of a directory of usage tutorials for the Chinese character input method according to an embodiment of the present invention;

DETAILED WAYS

Exemplary embodiments of the present invention are described below with reference to the accompanying drawings, which include various details of the embodiments of the present invention to facilitate understanding and should be considered as exemplary only. Accordingly, those of ordinary skill in the art will recognize that various changes and modifications of the embodiments described herein can be made without departing from the scope and spirit of the invention. Also, descriptions of well-known functions and constructions are omitted from the following description for clarity and conciseness.

The acquisition, storage, use and processing of data in the technical solution of the present invention all comply with the relevant provisions of laws and regulations.

Figure 1:
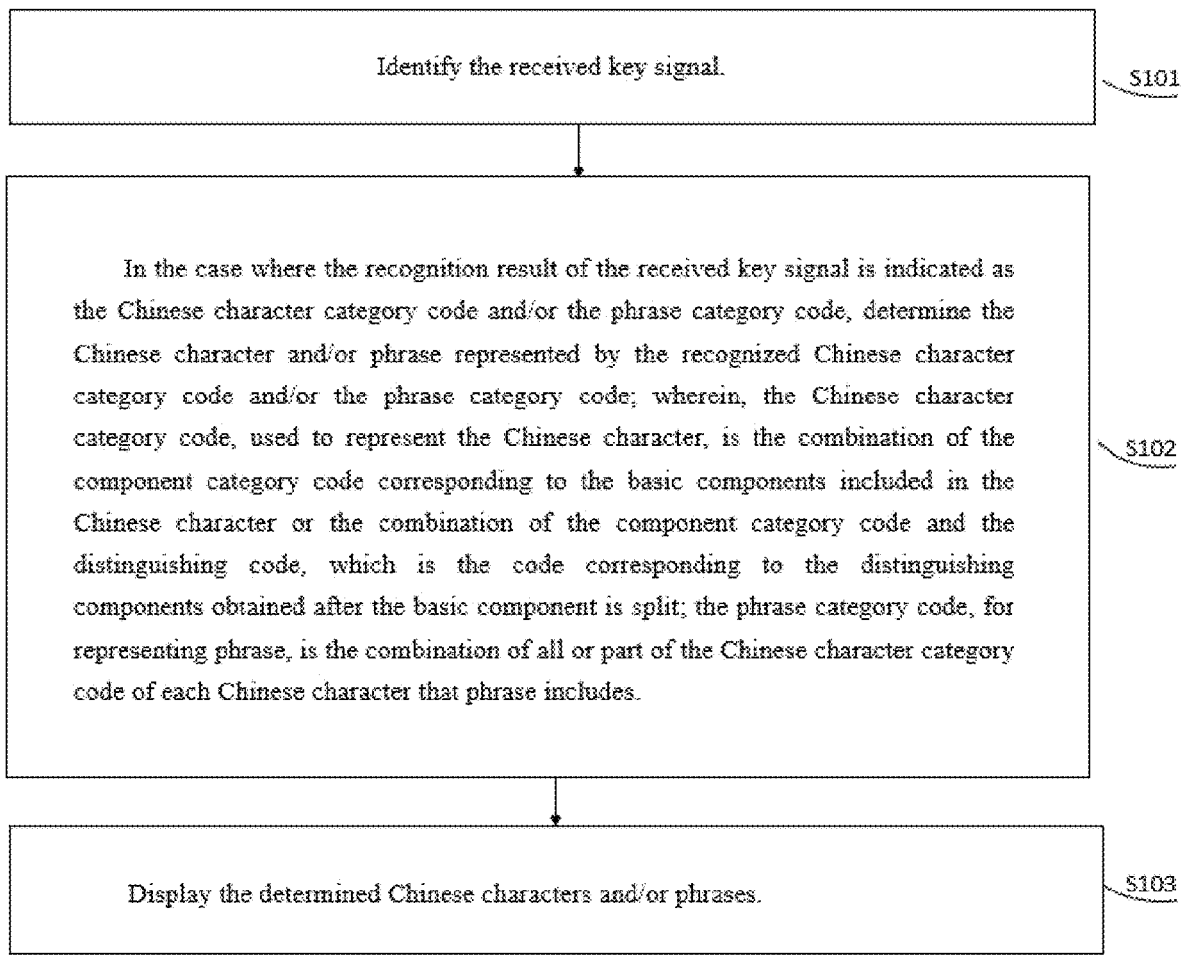
FIG. 1 is a schematic diagram of the main steps of a Chinese character input method according to an embodiment of the present invention.

FIG. 1 is a schematic diagram of main steps of a Chinese character input method according to an embodiment of the present invention. As shown in FIG. 1, a method for inputting Chinese characters according to an embodiment of the present invention mainly includes the following steps S101 to S103.

Step S101: Identify the received key signal. The key signal is generated by the keyboard when the user clicks, touches or presses a key, and is sent to the Chinese character input system of the embodiment of the present invention. The Chinese character input system of the embodiment of the present invention can be located in various terminal devices such as mobile phones, computers, and Pads. A key signal indicates that the user has entered a corresponding key, which corresponds to a key on the keyboard and is the character indicated by the key. For example, the key corresponding to the "A" key on the keyboard is the letter A.

Step S102: Under the situation that the identification result of the received key signal is indicated as the Chinese character category code and/or the phrase category code, determine the Chinese character and/or the phrase represented by the identified Chinese character category code and/or the phrase category code;

Wherein, the Chinese character category code, which is used to represent Chinese characters, is the combination of the component category code corresponding to the basic components included in the Chinese character or the combination of the component category code and the distinguishing code, and the distinguishing code is the code corresponding to the distinguishing components obtained by splitting the basic component. The phrase category code is the combination of all or part of the Chinese character category code of each Chinese character included in the phrase, and is used to represent the phrase.

Step S103: Display determined Chinese character and/or phrase.

In one embodiment of the present invention, the step of identifying the received key signal may include: identifying whether the received key signal includes a reserved key signal, and if the reserved key signal is not included signal, the recognition result of the received key signal is indicated as the Chinese character category code and/or the phrase category code. In the embodiment of the present invention, the reserved key position refers to the reserved key position with different functions from other key positions, and some required functions can be realized by the reserved key position.

The identification result of the received key signal is indicated as the Chinese character category code and/or the phrase category code, which is a preliminary judgment to the received key signal, that is, the preliminary identification of the received key signal is because the user has input keys associated with Chinese character category codes and/or phrase category codes.

If the received key signal includes a reserved key signal, and the first key signal in the received key signal is a reserved key signal, then the identification result of the signal is indicated as a Pinyin input signal, wherein the key position signal corresponding to the key position input after the reserved key position is identified as the Pinyin, and then the Chinese character or phrase corresponding to the Pinyin is displayed. In this way, the switching between Pinyin input and component input can be realized based on reserved key position, and at the same time, Pinyin can be used to reverse look up and display the category codes of Chinese characters or phrases, and learn while using them.

According to an embodiment of the present invention, determining the Chinese character and/or phrase represented by the recognized Chinese character category code and/or phrase category code includes: according to the key combination corresponding to the received key signal, in the Chinese character category input method table and in the phrase category input method table respectively, find the Chinese character category code and the phrase category code that are consistent with the described key position combination, determine the Chinese character and/or the phrase represented by the found Chinese character category code and/or the phrase category code, wherein, all the corresponding relationship between Chinese characters and Chinese character category codes is recorded in the Chinese character category input method table, and the corresponding relationship between phrases and phrase category codes is recorded in the phrase category input method table.

In the specific implementation process, the Chinese character category code of each Chinese character may be generated in advance to obtain the Chinese character category input method table. Wherein, the Chinese character category codes of Chinese characters are generated in the following manner: determine the number of components of the Chinese characters to be generated for Chinese character category codes, and the number of components is the number of basic components included in the Chinese characters, and the basic components of the Chinese characters are ordered; if the number of described components is 1, then the unique basic component of the Chinese character is split to obtain a plurality of orderly distinguishing components, and according to the category code and the first two distinguishing code of the unique basic component of the Chinese character generates the Chinese character category code of the Chinese character; if the number of components is 2, then the second basic component of the Chinese character is split to obtain a plurality of orderly distinguishing components, and according to the component category code of two basic components and the corresponding distinguishing code of the first two distinguishing components, generate the Chinese character category code of described Chinese character; if described component number is greater than or equal to 3, then according to the component category code of all basic components of the described Chinese character to generate the Chinese character category code of the Chinese character.

Before determining the number of components of a Chinese character for which a Chinese character category code is to be generated, the component category code of each basic component contained in the Chinese character can be read for use in generating the Chinese character category code in subsequent steps.

According to an embodiment of the present invention, the component category code is generated in the following manner: classify all basic components according to their shapes, and obtain multiple basic component shape categories; in each basic component shape category, a basic component that conforms to the specified rule is used as the category guide component of the basic component shape category; according to the shape similarity between the category guide components and the capital letters, a component category code corresponding to each basic component shape category is determined.

The embodiment of the present invention adopts the standard to define the basic components, and there is no phenomenon of random dismantling of characters. The basic component shape code is simple and clear, and a double letter in the shape code corresponds to a basic component. There is no duplicate code for Chinese character shape code. The coding includes all the basic component information in a Chinese character, no duplicate codes, intuitive and simple. The Chinese character category input method is easy to remember and use. The component category uses the shape as the only classification standard, and does not involve the sound and the meaning of the word. It is as intuitive and simple for users who know Chinese characters and those who do not know them. The grouping of components within the key makes the components better memorized. The typing method is simple, and you can start typing with almost zero learning. This input method basically does not need special learning when getting started, and the whole input process is very natural without many rules. Touch typing and fast typing are possible. As you become more familiar with the components, you can type faster and faster, enabling touch typing and professional typist speeds.

According to the "GB13000.1 Character Set Chinese Character Component Specification for Information Processing" and its attached "Chinese Basic Component List", 560 Chinese basic components are defined as the basic shape structure of Chinese characters in the form of standards. The 20902 Chinese characters in the GB13000.1 character set are all composed of these components.

According to the above specification of Chinese character components in the embodiments of the present invention, a component is a character formation unit composed of strokes and having the function of assembling Chinese characters. Basic components (i.e. basic Chinese character components) are the smallest components that are no longer split, and are divided into basic character-forming components (which are characters themselves, referred to as character-forming components) and basic non-character-forming components (which are not characters themselves, referred to as non-character components). Chinese characters can be composed of basic components. With the standards for basic components, the core problem of Chinese character encoding and input is transferred to how to use these basic components. With 560 basic components, analyzing and classifying them will help to use them better.

In the embodiment of the present invention, 560 basic components are classified according to the physical features of the basic components, and a plurality of basic component physical categories are obtained. To this end, the concept of a shape category guide component (ie, a category guide component hereinafter, or simply a guide component) is introduced, that is, a component can guide or represent the shape features (ie, shape physical characteristics) of a group of components. Through a certain number (such as more than twenty) guiding components, the physical characteristics of all components will be well expressed. Taking these guide components as the classification standard, all components are classified into these guide components, then the 560 basic components can be effectively classified according to the shape of the components.

After repeated tests, in an embodiment of the guide components of the present invention, 25 basic component shape categories and corresponding shape category guide components are determined: 十, 人, 八, 口, 乂, 田, 丿, 厶, 𠃌, 木, 日, 山, 尺, 一, 丨, ⺅, 丶, 丬, 丁, L, 冂, ⺊, 凵, 匚, and 亠. Most of them are the most commonly used character components. The shape of these formed components is relatively stretched and full, which is representative. Since they are all common words themselves, people are familiar with them, and they are very suitable as guiding components. There are five main stroke components, which can be used to represent components with obvious stroke characteristics. There are also several guide components that represent the general structure of the components, for example, components 匚 and 凵.

In order to label and store each of the above 560 basic components in a computer, it would be convenient to be able to represent them in Roman letters considering applications like keyboard typing. However, a total of 26 letters from A to Z, including upper and lower case, is only 52, which is definitely not enough, and the combination of two letters and numbers will greatly increase the number of components that can be represented, and there is still room for expansion.

Figure 2:
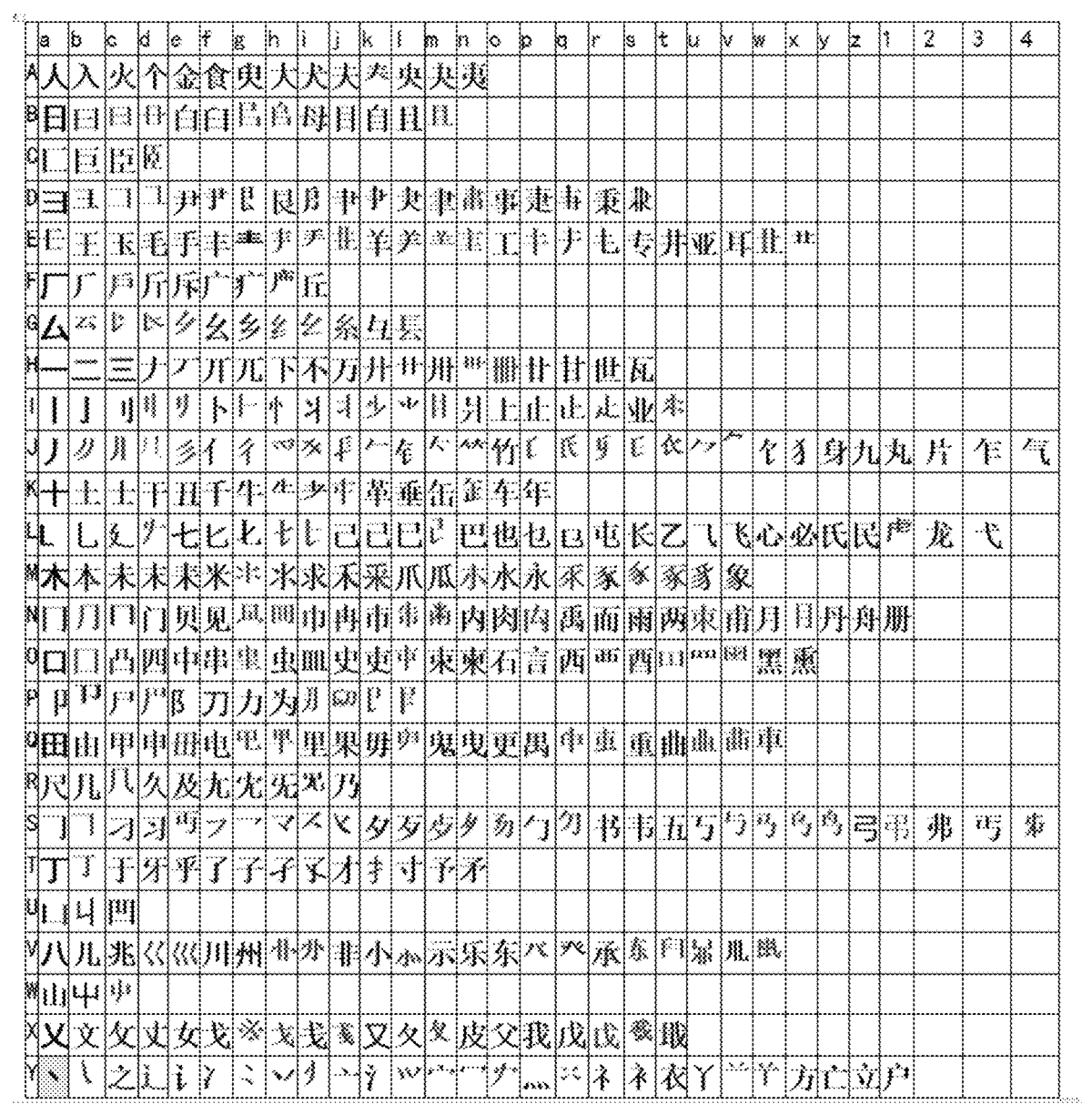

Based on the inventive concept of classifying basic components according to shape types and using double characters in an embodiment of the present invention, an embodiment of the present invention can construct and store a shape code table of Chinese basic components as shown in FIG. 2 component shape code table, FIG. 2 adopts double characters, and each Chinese character basic component (being called for short basic component or component) distributes in order according to the shapes of components, thereby generates an orderly code table, namely builds Chinese character basic component shape code table. There are 25 lines in the component shape code table of FIG. 2, and each line represents a basic component category, arranged from top to bottom and divided by shapes. It is encoded with a capital letter, called the component category code, as the first letter in the double-letter shape code of a component. The first component of each row is also called the category guide component, which can be used together with the corresponding component category code to represent the category. The other components in the row are arranged according to the similarity between the components.

There are a total of 30 columns in FIG. 2 (that is, columns a to 4 in FIG. 2), each column represents a specific basic component in a category, coded by a lowercase letter or number, as the second part of the basic component shape code, called the component category internal code. The overall shapes of the components in each category in FIG. 2 is relatively similar, which is easier to memorize, which is also an idea of this input method.

The shape codes of all basic components are defined in the Chinese character basic component shape code table of FIG. 2. For example, row A in FIG. 2 is called the "A" component category, also called the "人" component category. The first component in row "A" is the "人" component itself, in column "a", so its code number is "Aa". The component "本" is in the "b" column of the "M" category ("木" component category), and its code number is "Mb".

In general, in the basic component shape code table of the embodiment of the present invention, different first characters (such as uppercase letters) may be used as respective component category codes, and different second characters (such as lowercase letters or numbers) as the component category internal code of each category, the shape code of each basic component (for example, a two-character code composed of uppercase letters and lowercase letters or numbers) is obtained. The specific layout of the basic component shape code table can be pre-configured in the Chinese character input system of the embodiment of the present invention before use.

According to the embodiment of the present invention, after the component type code is determined, the matching relationship between the basic component shape category and the key position may be established according to the component category code corresponding to each basic component shape category; and, in response to the user's input instruction, display a virtual keyboard among a variety of virtual keyboards, the virtual keyboard includes a plurality of virtual keys, the virtual keys are in one-to-one correspondence with the key positions, and the virtual keys are used to show the user that the corresponding key positions match some or all of the basic components in the shape category, the various virtual keyboards can be switched to each other based on the user's selection instruction, and the basic component shape category corresponds to the key position one-to-one. For example, a default virtual keyboard may be displayed to the user, and a selection prompt may be provided at the same time, so that the user may select other virtual keyboards as required.

In the embodiment of the present invention, the category guide components and the keyboard capital letters are matched according to their shape similarity, and the matching relationship between the shape category of the basic components and the key positions is established. Specifically, as shown in the first two columns of FIG. 2, the established matching relationship between the basic component shape categories or the category guide components and the key positions is as follows (where "=" means corresponding):

人=A, 日=B, 匚=C, 彐=D, 亠=E, 厂=F, 厶=G, 丶=H, 丨=I, 丿=J, ⺊=K, L=L, 木=M, 冂=N, 口=O, ⺁=P, 田=Q, 尺=R, 𠃌=S, 丁=T, 凵=U, 八=V, 山=W, 乂=X, 丶=Y.

In the embodiment of the present invention, the shapes of the category guide components are matched with the capital letters of the keyboard, which can help the user to remember. Category guide components are equivalent to capital letters in English, and other components can be regarded as extension components of category guide components.

Figure 3:
FIG. 3 is a keyboard diagram with full components according to embodiments of the present invention.
Figure 4:
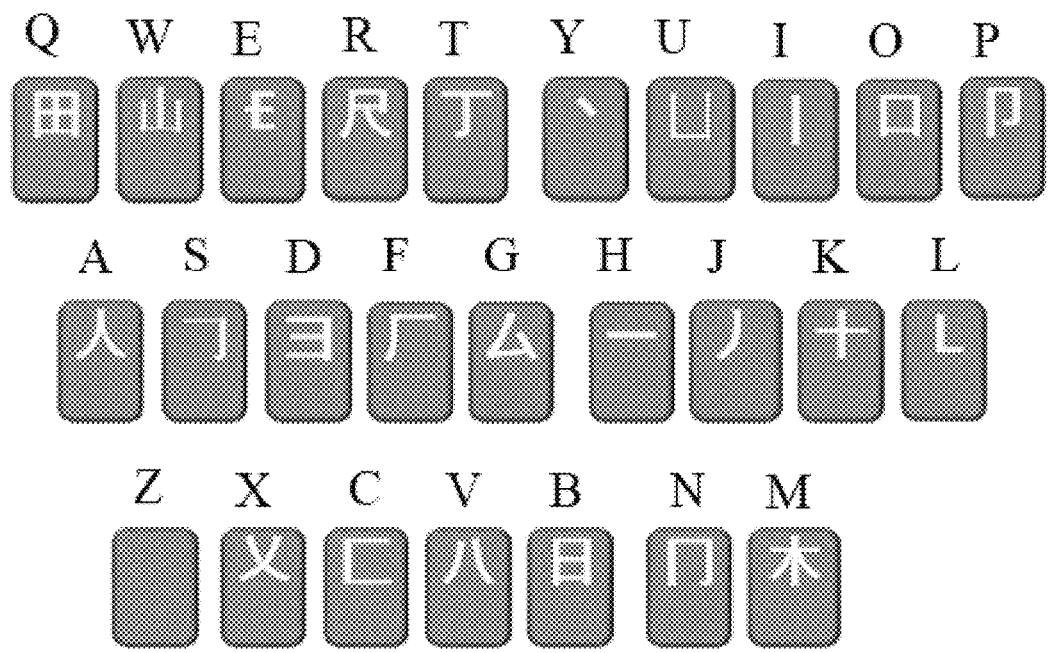
FIG. 4 is a keyboard diagram with the guide components according to embodiments of the present invention.
Figure 5:
FIG. 5 is a keyboard diagram with extension components according to embodiments of the present invention.

According to the previously established matching relationship between the basic component shape categories or the category guide components and the key positions, a corresponding keyboard can be generated in the embodiment of the present invention to display the corresponding relationship between all or part of the basic component shape category and each key position. FIG. 3 to FIG. 5 are various keyboard diagrams according to the embodiments of the present invention.

FIG. 3 is a pairing diagram of the components corresponding to FIG. 2 and the English keyboard, which includes all the basic components used in simplified Chinese characters (excluding the components only used for traditional Chinese characters and Japanese and Korean Chinese characters) and the key positions of the virtual keyboard, and so on for other languages. FIG. 4 is the pairing relationship between the category guide components in the basic component shape categories and the keys of the virtual keyboard. FIG. 5 shows the pairing relationship between some basic components in the basic component shape categories and the key positions of the virtual keyboard. Here, part of the basic components refers to the category guide components and its extension components, wherein the extension components are extended from the category guide components according to the physical similarity, which is consistent with the main physical features of the category guide components, but there will be other additional features. They include common and representative components that users need to remember. For example, an extension of the category guide component "人" includes "大". It can be seen from FIGS. 3 to 5 that the key "Z" is a reserved key, which has no matching relationship with the basic components.

According to one embodiment of the present invention, the virtual keys are used to group and display some or all of the basic components in the shape category of the basic components matching the corresponding key positions according to the shape similarity between the basic components. Referring to FIG. 3, in order to facilitate memory, the basic components in each key that are already relatively similar are divided into several groups according to the shape similarity between these basic components, and several more similar components are placed in one group and are arranged in the same row within the key. For example, the third row of the ' 人 ' key (ie the A key) includes several more similar basic components such as 大, 犬, 夫, 夭. In this way, when selecting components, it can be more accurate and easy to remember.

On the basis of the basic component shape code, the Chinese characters can be encoded according to the specification. Firstly, according to "GB13000.1 Character Set Chinese Character Component Specification for Information Processing", Chinese characters are divided into basic components. As the specification stipulates that the basic components shall not be disassembled, the separation and connection can be disassembled, and the strokes crossing each other cannot be disassembled, so the steps of disassembling characters are relatively simple and clear. For example, "明" is split into "日" and "月". "非" is split into "丰" and "__". When encountering individual Chinese characters with two or more split methods, split them according to the following rules: The crossed strokes shall not be dismantled; the number of components is as low as possible; components in earlier positions are as large as possible, with the exception of separate shapes.

However, a total of more than 200 components are also Chinese characters, and the keyboard has only 26 keys, so a single-component character cannot be expressed and output by its only component, so some kind of auxiliary information other than the component information of Chinese characters is needed.

The traditional shape code input method generally uses the strokes or phonemes of Chinese characters as auxiliary information on the basis of component information. However, this will introduce other information, which will complicate the input of Chinese characters and affect the efficiency.

In order to solve the technical problem, the present invention provides the required auxiliary information by analyzing the composition structure of the basic component itself, that is, which smaller components are structurally composed. In the present invention, such a smaller component is called a distinguishing component, and a code generated by the distinguishing component as input auxiliary information is called a distinguishing code. In an embodiment of the present invention, the distinguishing code is generated in the following manner: for each distinguishing component, determine whether it's a basic component; if yes, then determine the distinguishing cod of the distinguishing component corresponding to the component category code of the basic component; if not, determine the similarity between the distinguishing component and all the basic components, and get the distinguishing code of the distinguishing component from the component category code of the closest basic component.

It should be noted that the distinguishing components are not components directly contained in Chinese characters, but an auxiliary tool for distinguishing different basic components themselves, and its function is similar to that of strokes in other shape code input methods, and is not affected by rule restriction in the specification of Chinese character component rules that the component itself and cross strokes must not be split.

Distinguishing components are components, so they are more eye-catching, the keyboard distribution is wider than the strokes, which is consistent with the basic method of this input method, so that the entire input method is completely realized based on components.

The method of splitting a basic component into distinguishing components is the same as the rules for dividing Chinese characters into components. For example, the basic component "口" is divided into distinguishing components "冂" and "一", and according to the similarity between the distinguishing components and all basic components, in conjunction with the Chinese character basic component shape code table of FIG. 2 to generate the distinguishing code. However, in the absence of other methods, the intersecting strokes can be split into stroke components, for example, the component "十" is split into stroke distinguishing components " · " and "丨", and a distinguishing code is generated.

In the process of splitting, there will be several special folded strokes that are not components. At this time, they can be classified into the corresponding stroke components according to the similarity. For example, "及" is divided into distinguishing components "丿", "乛" and "㇏".

Since the commonly used components are commonly used Chinese characters or common radicals, the process of inputting each component in a Chinese character is basically the process of inputting each Chinese character or radical contained in the Chinese character, therefore always dealing with big shape units, very eye-catching and easy.

After obtaining the component category code of the basic component of Chinese characters and the distinguishing code of the distinguishing components obtained by the component splitting according to the aforementioned steps, the Chinese character category code of the Chinese character can be generated in combination with the component category code and the distinguishing code, and the Chinese character category input method table for Chinese character input can be generated according to the Chinese character category code. Specifically, when generating the Chinese character category code of the Chinese character, the Chinese character will be split first to obtain the components of the Chinese character and the number of components, the number of components is the number of basic components included in the Chinese character, and the basic components of the Chinese character are ordered, for example: after splitting the word "呆" into basic components, there are two basic components, "口" and "木", and according to the stroke order, it can be known that the basic component "口" is before the basic component "木".

For a Chinese character composed of three or more basic components, the Chinese character category code of the Chinese character can be generated directly according to the component category code of all basic components of the Chinese character. For example: for the Chinese character "晶", it can be divided into components "日", "日" and "日", and the component category code corresponding to the component "日" is "B", then the Chinese character category code for the Chinese character "晶" is "BBB". By triggering the keys "B", "B" and "B", and then selecting the candidate Chinese character "晶" from the lower part of the editing interface by inputting number or by mouse/touch, the input of the Chinese character "晶" can be completed.

For a single-component Chinese character composed of only one component, the unique basic component of the Chinese character is split to obtain a plurality of ordered distinguishing components, and the component category code of the unique basic component of the Chinese character and the corresponding distinguishing code of the first two distinguishing components, the Chinese character category code of the Chinese character is generated. For example: for the Chinese character "日", since it is a single-component Chinese character, the basic component "日" is split to obtain the distinguishing components "凵" and "一", since the distinguishing component "口" and the basic component "凵" is the same, so the distinguishing code corresponding to the distinguishing component "冂" is the component category code "O" corresponding to the basic component "冂"; correspondingly, the distinguishing code corresponding to the distinguishing component "一" is "H". Thus, Chinese character category code "BOH" for the Chinese character "口" can be generated according to the component category code "B" of the basic component "日", the distinguishing code "O" corresponding to the distinguishing component "口", and the distinguishing code "H" corresponding to the distinguishing component "一". The input of the Chinese character "日" can be completed by triggering the keys "B", "O" and "H", and then selecting the candidate Chinese character "口" from the lower part of the editing interface by inputting numbers or by mouse/touch. For another example, for the single-component Chinese character "卜", the basic part "卜" can be divided into the distinguishing components "一" and "丨", and then according to the component category code "K" of the basic component "十" and the distinguishing code "H" of the distinguishing component "一" and the distinguishing code "I" of the distinguishing component "丨" generate the Chinese character category code "KHI" of the Chinese character "卜". The input of the Chinese character "卜" can be completed by triggering the keys "K", "H" and "I", and then selecting the candidate Chinese character "卜" from the lower part of the editing interface by inputting number or by mouse/touch.

For a two-component Chinese character composed of two components, the second basic component of the Chinese character is split to obtain a plurality of ordered distinguishing components, and the component category code of the two basic components of the Chinese and the first two distinguishing code corresponding to the distinguishing components generates the Chinese character category code of the Chinese character. For example: for the two-component Chinese character "呆", it can be divided into two basic components "凵" and "木", and the second basic component "木" can be further divided to distinguishing components "十" and "八", since the distinguishing component "丨" is the same as the basic component "十", the distinguishing code corresponding to the distinguishing component "十" is the component category code "K" corresponding to the basic component "丨"; The corresponding distinguishing code for "八" is "V". Therefore, according to the component category code "O" of the basic component "凵", the component category code "M" of the basic component "木", the distinguishing code "K" corresponding to the distinguishing component "十", and the distinguishing code of "V" corresponding the distinguishing component "八" generates the Chinese character category code "OMKV" of the Chinese character "呆". By triggering the keys "O", "M", "K" and "V", and then selecting the candidate Chinese character "呆" from the bottom of the editing interface by inputting number or by mouse/touch to complete the Chinese character "呆".

All basic components mentioned in the embodiments of the present invention include basic components for generating simplified Chinese characters, traditional Chinese characters, Chinese characters in Japanese, and Chinese characters in Korean, that is: all basic components used when the present invention constructs the shape code table of basic components include basic components for generating simplified Chinese, traditional Chinese, Chinese characters in Japanese, and Chinese characters in Korean.

According to the content introduced above, the input of Chinese characters can be carried out according to the Chinese character category codes of the Chinese characters. Then, correspondingly, the present invention can also use a similar method to input a phrase.

According to yet another embodiment of the present invention, the method for inputting Chinese characters of the present invention further comprises: pre-generating the phrase category code of each phrase to obtain the phrase category input method table, wherein the phrase category code of the phrase is generated in the following manner: determine the Chinese character category code of each Chinese character that the phrase of the phrase category code to be generated comprises; according to the encoding number of the Chinese character category code of each Chinese character in the phrase category code of setting, according to the sequence of encoding in the Chinese character category code, from the described in the Chinese character category code of each Chinese character that phrase comprises, extract the coding of the number equal to the described coding number, and obtain the phrase category code of described phrase according to the order combination of Chinese characters in the described phrase; or the Chinese character category codes of each Chinese character of the phrase are combined to obtain the phrase category codes of the phrases.

In the embodiment of the present invention, for the commonly used phrases, the phrase category codes can be generated in advance, and the phrase category input method table can be obtained, so that when the phrase category input method is performed, the phrase category input method table can be used for efficient matching of phrases. Specifically, since the number of codes (for example: capital letters) in the corresponding Chinese character category codes of the single-component Chinese characters other than '一' and '乙' is 3, when the phrase category codes are generated in the present invention, the phrase category codes of the phrases can be obtained by combining the first coding in the Chinese character category code of each Chinese character in the phrase, or can be obtained by combining the first two codes in the Chinese character category code of each character in the phrase, or can be obtained by combining the first three codes in the Chinese character category code of each Chinese character in the phrase, and can be directly combined and obtained by all the codes of the Chinese character category code of each Chinese character in the phrase. The phrase category code is continuous, and there is no space in the middle of the phrase category code. For example: for the phrase "清华大学", the phrase category code that is combined and generated by the first code in the Chinese character category code of each character in the phrase is "YJAY", and is composed of the first Chinese character category code of each character in the phrase. The phrase category code that the first two codes are combined to generate is "YEJLAHYY"; the phrase category code that is combined and generated by the first three codes in the Chinese character category code of each Chinese character in the phrase or by all code of each Chinese character in the phrase is "YENJLKAHYYYT".

According to yet another embodiment of the present invention, in the case where the recognition result of the received key signal is indicated as the sentence category code, display the determined sentence; wherein, the set sentence category code consists of complete Chinese character category code and/or phrase category code of at least one continuous Chinese character and/or phrase. The so-called sentence input means that after inputting a Chinese character or phrase, without pressing the select key, continue to type the next Chinese character or phrase in the sentence until the entire sentence is selected. In sentence input mode, the full code of each Chinese character or phrase is required to be input.

Figure 6:
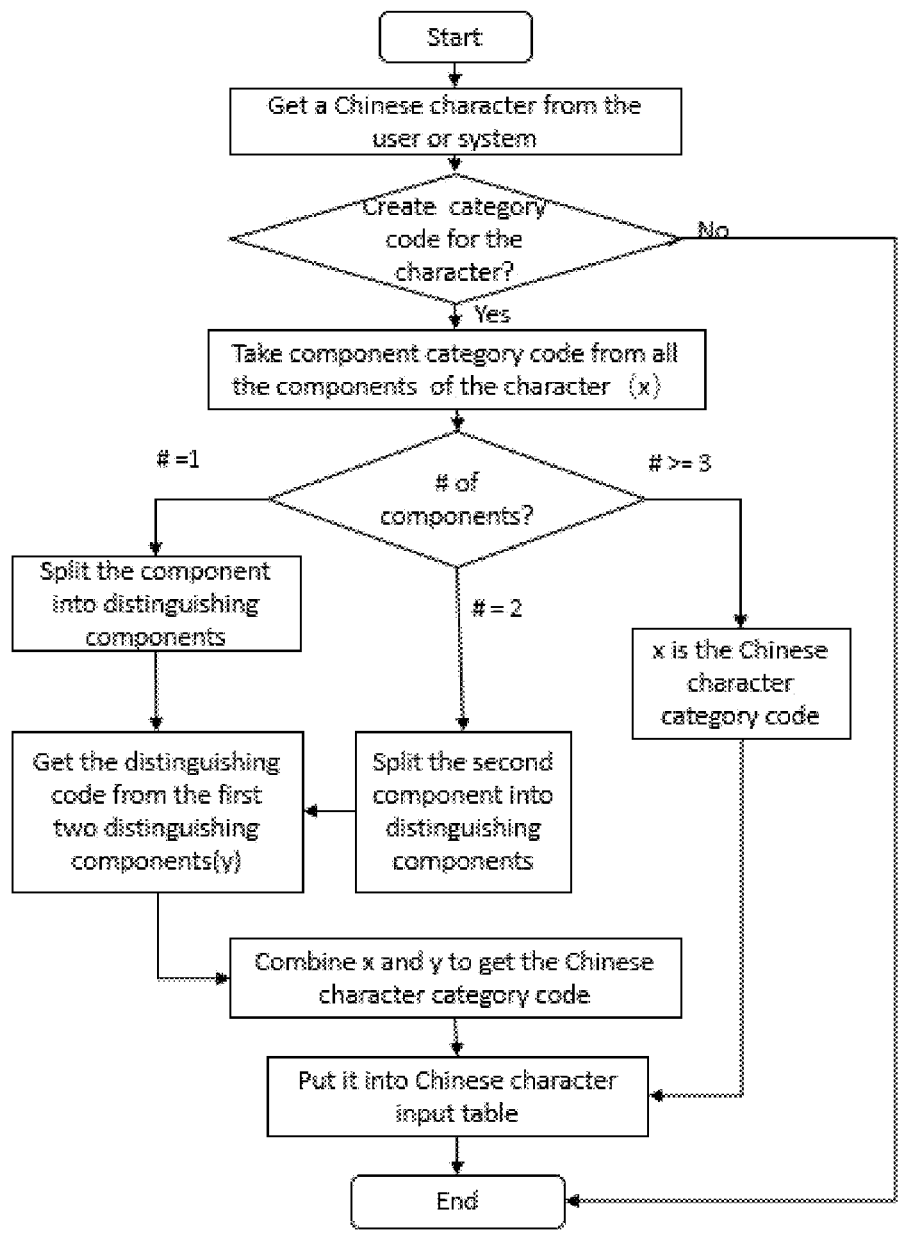
FIG. 6 is a schematic flow chart of generating a Chinese character category code according to an embodiment of the present invention.

FIG. 6 is a schematic flowchart of generating a Chinese character category code and according to an embodiment of the present invention. As shown in FIG. 6, the process is mainly as follows:

Obtain the content entered by the user or the content received by the system;

Judging whether it is to generate the Chinese character category code, wherein, if the content input by the user or the content that the system receives is a Chinese character, then the Chinese character category code will be generated; otherwise, the phrase category code will be generated;

When judging to generate Chinese character category code, at first from the Chinese character basic component shape code table shown in FIG. 2, read the component category code of all the basic components included in this Chinese character, denoted as x;

Determine the number of components of Chinese characters;

If the number of components is 1, then this component is split into distinguishing components, and the corresponding distinguishing code of the first two distinguishing components are obtained, denoted as y, and x and y are combined to obtain the Chinese character category code of this Chinese character;

If the number of components is 2, then the second component is split into distinguishing components, and the corresponding distinguishing code of the first two distinguishing components are obtained, denoted as y, and x and y are combined to obtain the Chinese character category code of this Chinese character;

If the number of components is 3 or more, then directly use the component category code x of all components as the Chinese character category code of the Chinese character;

The Chinese character category code of this Chinese character is added in the Chinese character input method table;

According to yet another embodiment of the present invention, when judging not to generate the Chinese character category code, but to generate the phrase category code, first read the Chinese character category code of each Chinese character included in this phrase from the Chinese character input method table;

Make sure all the Chinese characters have their category codes created;

Obtain the encoding number n of the Chinese character category code of each Chinese character in the set phrase category code;

If n can be obtained, then according to the sequence of each code in the Chinese character category code, extract code with n letters from the Chinese character category code of each Chinese character included in the phrase, and combine them in the order of the Chinese characters in the phrase to get the phrase category code of the phrase;

Otherwise, if failing to obtain n, then obtain the Chinese character category code of each Chinese character included in the phrase, and obtain the phrase category code of the phrase according to the order combination of the Chinese characters in the phrase;

The phrase category code of the phrase is added to the phrase category input method table.

According to the above process, the Chinese character category code and the phrase category code can be generated, and then, according to the key signal input by the user, it can be determined whether the user inputs a Chinese character or a phrase, and the recognition result of the specific Chinese character or phrase. Specifically, the identification result of the key signal can be obtained by matching and identifying the key signal input by the user with the Chinese character input method table and the phrase category input method table.

After the above steps, the identified Chinese characters and/or phrases are displayed. Wherein, when displaying the determined Chinese characters and/or phrases, the determined Chinese characters and/or phrases may be displayed in sequence according to the frequency of use of the determined Chinese characters and/or phrases. The frequency of use of Chinese characters can be based on statistics of public releases. The higher the frequency of use of a character, the higher it ranks in the selectable characters.

In the process of inputting Chinese characters using the Chinese character input method of the present invention, the components can be classified and memorized. The difficulty of the shape code input method lies in remembering many components. The invention divides the components into five categories, first memorize the category guide components, then through the main feature, memorize the extension components, and then through the association, memorize the attached components and twin components of the category guide components and the extension components. If you want to input traditional Chinese characters, remember the components for traditional Chinese characters at the end. Through this step-by-step memory method from the shallower to the deeper, the purpose of each breaking is achieved.

Figure 7:
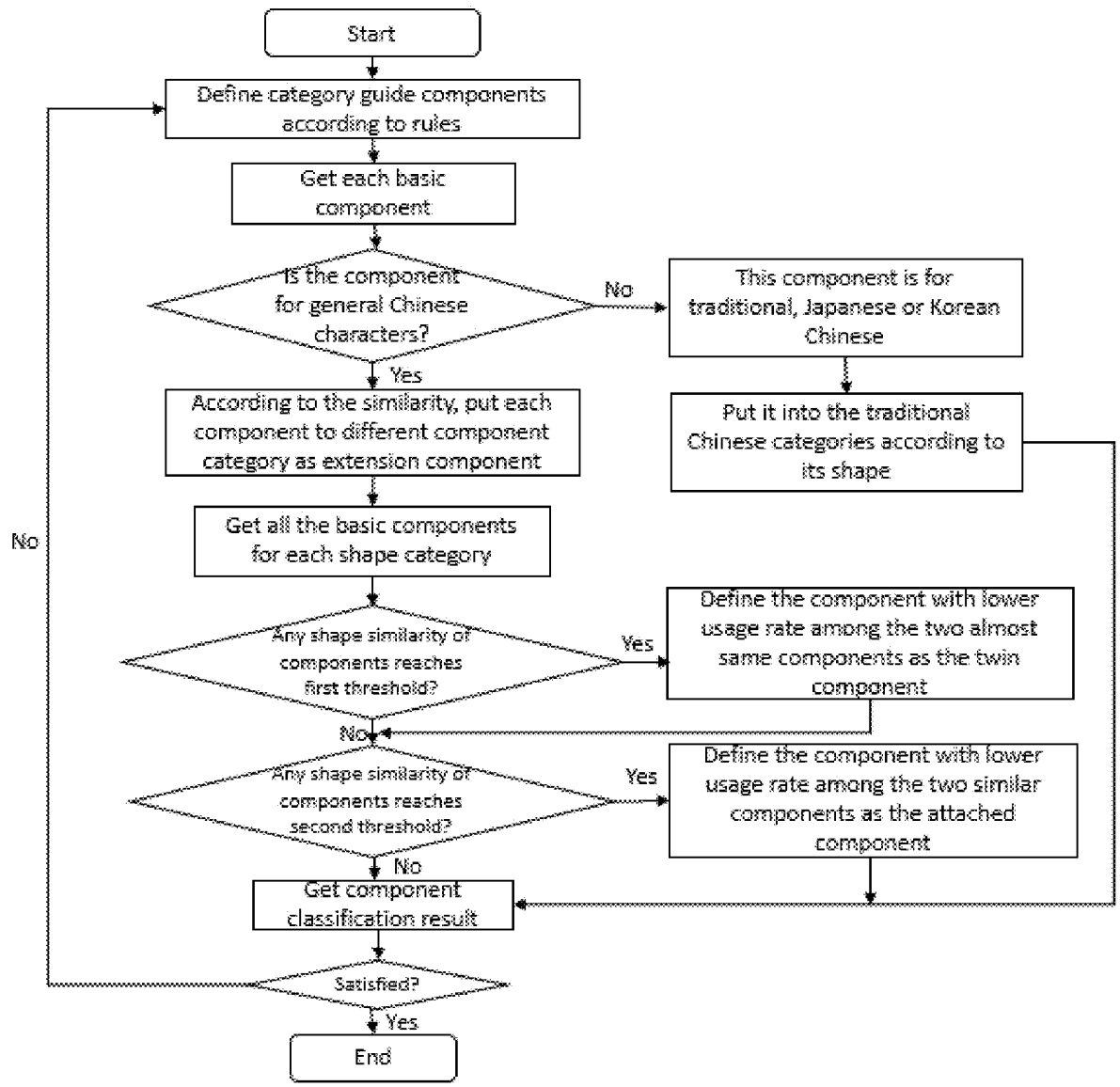
FIG. 7 is a schematic diagram of a component classification process according to an embodiment of the present invention.

FIG. 7 is a schematic diagram of a component classification process according to an embodiment of the present invention. As shown in FIG. 7, when classifying the basic components of Chinese characters, all basic components are classified according to the shapes, and a plurality of basic component shape categories are obtained. For each basic component shape category, first determine a basic component as a category guide component according to a specified rule.

Then obtain each basic component in turn, and judge whether the component is a general simplified Chinese character component. Specifically, it can be judged by judging whether the component appears in the 6763 general Chinese characters of GB2312. If it appears, the component is a Chinese character component used in general simplified Chinese characters; otherwise, the component is a traditional Chinese character and Japanese-Korean Chinese character component, and according to it shape, the component is classified into the traditional Chinese and Japanese-Korean Chinese character component group corresponding to a category guide component.

Afterwards, for all the components used in the general simplified Chinese characters, according to the similarity between the components used in the general simplified Chinese characters and the category guide components, they are classified into different basic component shape categories, as the extension components of the category guide components.

The extension component is extended from the category guide component according to the physical similarity, which is consistent with the main physical characteristics of the category guide component, but has other additional features. They include common and representative components. For example, an extension of the category guide component "人" includes "亻". As shown in FIG. 5, the basic components corresponding to the keys of each virtual keyboard include a category guide component and its extension components.

Then, obtain all the basic components included in each basic component shape category, and determine whether there are basic components whose shape similarity reaches the first threshold in each basic component shape category. Based on the use probability of each basic component, the basic component with a lower probability of use among two components with almost the same shape is used as a twin component of the other basic component. In a specific implementation, the first threshold may be set to, for example, more than 90%. If not, it means that there are no twin components, and it is judged whether each basic component has a basic component whose shape similarity reaches the second threshold. Using probability, a basic component with a lower probability of use among two components with similar shapes is used as a attached component of the other basic component. Wherein, the second threshold should be smaller than the first threshold. In a specific implementation, the second threshold may be set to, for example, more than 80%, and should be less than 90% of the first threshold.

According to the category guide components, extension components, twin components, attached components, and traditional Chinese/Japanese-Korean Chinese character component groups are determined in the preceding steps, the component classification results can be obtained;

Finally, it is judged whether the above-mentioned component classification result is satisfied, and if not, the above-mentioned process is re-executed to perform component classification again.

FIG. 8 is a schematic diagram of an attached component of an embodiment of the present invention. An attached component is attached to a guide or extension component and is similar in shape to the component to which it is attached, usually with one or two differences. Through association, it should be possible to associate an attached component with one of its corresponding guide components or extension components. For example, "刁" and "夕", "刁" is less commonly used, it can be used as an attached component of "夕".

FIG. 9 is a schematic diagram of a twin component according to an embodiment of the present invention. A twin component is one that has almost the same shape as a category guide or extension, and when you see a twin, you should have no trouble thinking of its corresponding category guide or extension component. For example, the two basic components "±" and "土", "±" is less commonly used, it can be used as the twin component of "±".

FIG. 10 is a schematic diagram of a shape code table of traditional Chinese characters and Japanese-Korean Chinese characters according to an embodiment of the present invention. These components are only used for Chinese character input in traditional Chinese and Japanese and Korean. In the Figure, the component category codes are from A to Y, and the component category internal codes are from A to K.

Combining the above-mentioned FIG. 7 to FIG. 10, the Chinese character input method of the present invention can be used to input Chinese characters.

FIG. 11 is a schematic diagram of a directory of usage tutorials of the Chinese character input method according to an embodiment of the present invention. In an embodiment of the present invention, this Chinese character input method is named as "component input method", and through the use tutorial catalog shown in FIG. 11, the user can be led to learn the component input method through 10 practice steps, mainly including: learning components paired with keyboard, combining components and keyboard pairing, try inputs, learning extensions, review extensions, practice extensions, learn attached, learn twins, practice one-component Chinese characters, practice two-component Chinese characters, comprehensive practice, and more. Through the step-by-step memory and practice method from the shallower to the deeper, the purpose of learning to use the component input method to input Chinese characters is achieved.

Figure 12:
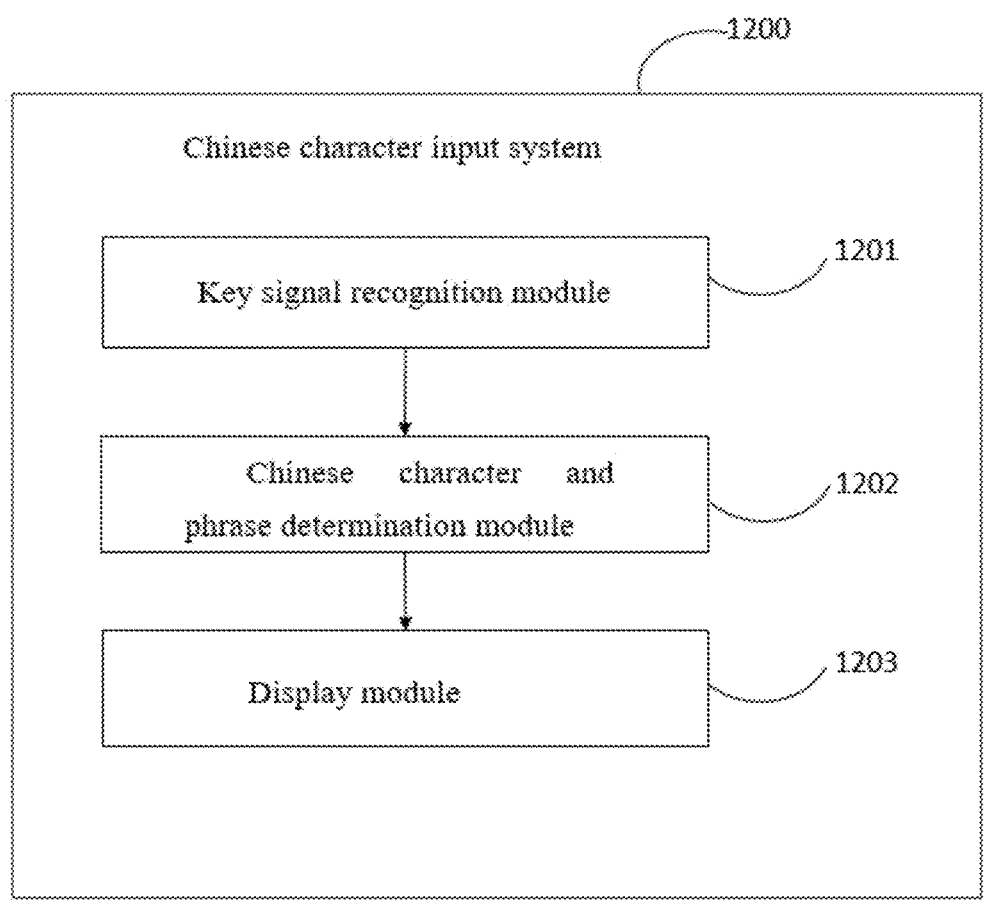
FIG. 12 is a schematic diagram of main modules of a Chinese character input system according to an embodiment of the present invention.

FIG. 12 is a schematic diagram of main modules of a Chinese character input system according to an embodiment of the present invention. As shown in FIG. 12, the Chinese character input system 1200 according to the embodiment of the present invention mainly includes:

Key signal identification module 1201 is used to identify the received key signal;

Chinese character and phrase determination module 1202, used to indicate that the identification result of the received key signal is the Chinese character category code and/or the phrase category code, determine the identified Chinese characters and/or phrases represented by Chinese character category code and/or the phrase category code; wherein, the Chinese character category code, for representing Chinese characters, is the combination of the corresponding component category code of the basic components that Chinese characters comprise or the combination of the component category code and the distinguishing code, and the distinguishing code is the corresponding coding of the distinguishing components that obtains after splitting the basic component; phrase category code is the combination of all or part of the Chinese character category code of each Chinese character that phrase includes, for representing phrase;

The display module 1203 is used to display the determined Chinese characters and/or phrases.

According to an embodiment of the present invention, the key signal identification module 1201 can also be used to: identify whether the received key signal includes a key signal of a reserved key, if the key of the reserved key is not included in key signal, the recognition result of the received key signal is indicated as the Chinese character category code and/or the phrase category code.

According to another embodiment of the present invention, the key signal identification module 1201 can also be used for: if the received key signal includes a reserved key signal, and the first key signal is the key signal of the reserved key, then the recognition result of the received key signal is indicated as a Pinyin input signal, wherein the key signal corresponding to the key input after the reserved key is identified as Pinyin; and, the display module 1203 can also be used to: display the Chinese characters or phrases corresponding to the Pinyin. In this way, the switching between Pinyin input and component input can be realized based on reserved key positions, and at the same time, Pinyin can be used to reverse look up and display the category codes of Chinese characters or phrases, and learn while using them.

According to yet another embodiment of the present invention, the Chinese character and phrase determination module 1202 can also be used to: according to the key combination corresponding to the received key signal, in the Chinese character category input method table and the phrase category input method table respectively, look up the Chinese character category code and the phrase category code that the key position combination is consistent, and determine the Chinese character and/or the phrase that the found Chinese character category code and/or the phrase category code represent, wherein, in the Chinese character category input method table records corresponding relationship between Chinese characters and Chinese character category codes, the corresponding relationship between phrases and phrase category codes is recorded in the phrase category input method table.

According to yet another embodiment of the present invention, the Chinese character input system 1200 further includes a Chinese character category code generation module (not shown in the Figure), which is used to: generate a Chinese character category code of each Chinese character in advance, so as to obtain the Chinese character category input method table, wherein, the Chinese character category codes of Chinese characters are generated by the following manner: determine the number of components of the Chinese characters to be generated Chinese character category codes, and the number of components is the number of basic components included in the Chinese characters, and the basic components of the Chinese characters are ordered. If the number of components is 1, then the unique basic component of the Chinese character is split to obtain a plurality of orderly distinguishing components, and according to the component category code of the unique basic component of the Chinese character and the first two distinguishing code corresponding to the component generates the Chinese character category code of the Chinese character; if the number of the components is 2, then the second basic component of the Chinese character is split to obtain a plurality of orderly distinguishing components, and according to the component category code of two basic components of the Chinese character and the corresponding distinguishing code of the first two distinguishing components generate the Chinese character category code of described Chinese character; if the number of the components is equal or more than 3, the component category codes of the basic components of the Chinese character is used to generate the Chinese character category code of the Chinese character.

According to another embodiment of the present invention, the component category code is generated by the following methods: classifying all basic components according to their shapes to obtain a plurality of basic component shape categories; a basic component is used as a category guide component of the basic component shape category; according to the shape similarity between the category guide components and capital letters, a component category code corresponding to each basic component shape category is determined.

According to another embodiment of the present invention, the Chinese character input system 1200 further includes a virtual keyboard generation and display module (not shown in the Figure), which is used for: establishing a basic matching relationship between the component shape category and the key position; and, in response to the user's input instruction, displaying a virtual keyboard in a variety of virtual keyboards, the virtual keyboard includes a plurality of virtual keys, and the virtual keys and the key positions are one by one. Correspondingly, the virtual keys are used to display some or all of the basic components in the basic component shape category matching the corresponding key position to the user. The categories correspond to the keys one by one.

According to another embodiment of the present invention, the virtual keys are used to group and display some or all of the basic components in the shape category of the basic components matching the corresponding key positions according to the shape similarity between the basic components.

According to yet another embodiment of the present invention, the distinguishing code is generated in the following manner: for each distinguishing component, determine whether it's a basic component; if yes, then determine the distinguishing cod of the distinguishing component corresponding to the component category code of the basic component; if not, determine the similarity between the distinguishing component and all the basic components, and get the distinguishing code of the distinguishing component from the component category code of the closest basic component.

According to yet another embodiment of the present invention, all the basic components include basic components for generating simplified Chinese characters, traditional Chinese characters, Chinese characters in Japanese, and Chinese characters in Korean.

According to yet another embodiment of the present invention, the Chinese character input system 1200 further includes a phrase category code generation module (not shown in the Figure) for: pre-generating the phrase category code of each phrase to obtain the phrase category input method table, wherein, the phrase category code of phrase is generated in the following manner: determine the Chinese character category code of each Chinese character that the phrase of the phrase category code to be generated comprises; according to the setting of the encoding number of the Chinese character category code of each Chinese character in the phrase category code, according to the sequence of coding in the Chinese character category code, from the Chinese character category code of each Chinese character that described phrase comprises, extract the coding of the number equal to the described coding number, and according to the order combination of Chinese characters in the described phrase, obtain the phrase category code of the phrase; or, the Chinese character category code of each Chinese character included in the phrase is combined to obtain the phrase category code of the phrase.

According to yet another embodiment of the present invention, the display module 1203 may be further configured to display the determined Chinese characters and/or phrases in sequence according to the determined usage frequencies of the Chinese characters and/or phrases.

According to yet another embodiment of the present invention, the display module 1203 may be further configured to identify whether the received key signal includes a Chinese sentence category code and display the determined Chinese sentence; wherein, the Chinese sentence category code consists of full Chinese character category code and/or full phrase category code of at least one Chinese characters and/or phrases.

In addition, an embodiment of the present invention also provides a keyboard for inputting Chinese characters based on a Chinese character input method, comprising: keys matching the key positions corresponding to the component category code and the distinguishing code, and key matching the reserved key position; press the key, the keyboard generates a corresponding key signal according to the user's key operation.

According to the technical solution of the embodiment of the present invention, by identifying the received key signal; when the identification result of the received key signal is indicated as a Chinese character category code and/or a phrase category code, determine the recognized Chinese character and/or phrase represented by Chinese character category code and/or the phrase category code; wherein, the Chinese character category code, for representing Chinese characters, is the combination of the corresponding component category code of the basic components that a Chinese character comprises or the combination of the component category code and the distinguishing code, and the distinguishing code is the corresponding code of the distinguishing components obtained after the basic component is split; the phrase category code is the combination of all or part of the Chinese character category codes of each Chinese character that the phrase includes, for representing the phrase; with the technical solution of the present invention to display the determined Chinese character and/or the phrase, Chinese characters can be input only based on the component code, no need to combine other factors, the input is simple and convenient, solves the problem of cluttered characters, conforms to the wording, easy to remember and use, no special learning is required, and the entire input process is very natural, there are not many rules, which reduces the difficulty of learning, the repetition rate is low, the input speed is fast, and there are no special requirements for pronunciation and equipment conditions.

Figure 13:
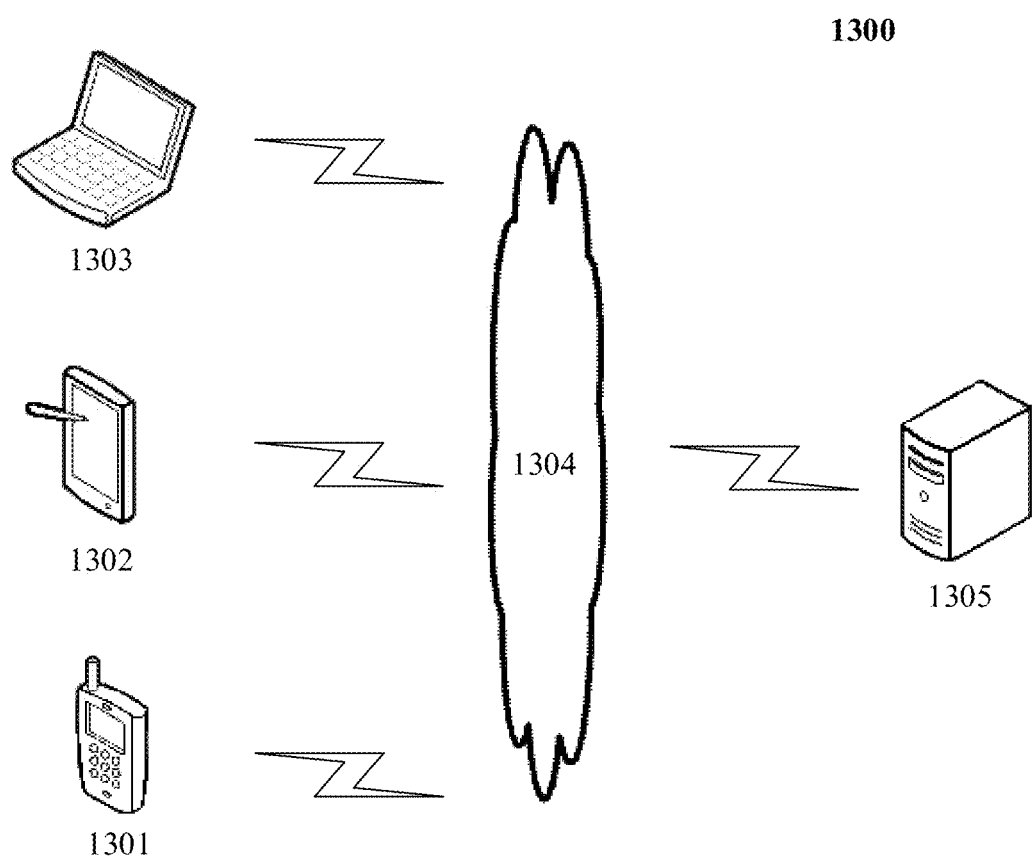
FIG. 13 is an exemplary system architecture diagram to which an embodiment of the present invention may be applied.

FIG. 13 shows an exemplary system architecture 1300 of a Chinese character input method or a Chinese character input system to which embodiments of the present invention may be applied.

As shown in FIG. 13, the system architecture 1300 may include terminal devices 1301, 1302, and 1303, a network 1304 and a server 1305. The network 1304 is the medium used to provide the communication link between the terminal devices 1301, 1302, 1303 and the server 1305. Network 1304 may include various connection types, such as wired, wireless communication links, or fiber optic cables, among others.

The user can use the terminal devices 1301, 1302, 1303 to interact with the server 1305 through the network 1304 to receive or send messages and the like. Various communication client applications may be installed on the terminal devices 1301, 1302 and 1303, such as shopping applications, web browser applications, search applications, instant messaging tools, email clients, social platform software, etc. (only examples).

The terminal devices 1301, 1302, 1303 may be various electronic devices having a display screen and supporting web browsing, including but not limited to smart phones, tablet computers, laptop computers, desktop computers, and the like.

The server 1305 may be a server that provides various services, such as a background management server that provides support for shopping web sites browsed by the terminal devices 1301, 1302, and 1303 (just an example). The background management server can analyze and process the received product information query request and other data, and feed back the processing results (such as target push information, product information—just an example) to the terminal device.

It should be noted that, the Chinese character input method provided by the embodiment of the present invention is generally executed by a server or a terminal device, and correspondingly, the Chinese character input system may be set in the server or the terminal device.

It should be understood that the numbers of terminal devices, networks and servers in FIG. 13 are merely illustrative. There can be any number of terminal devices, networks and servers according to implementation needs.

Figure 14:
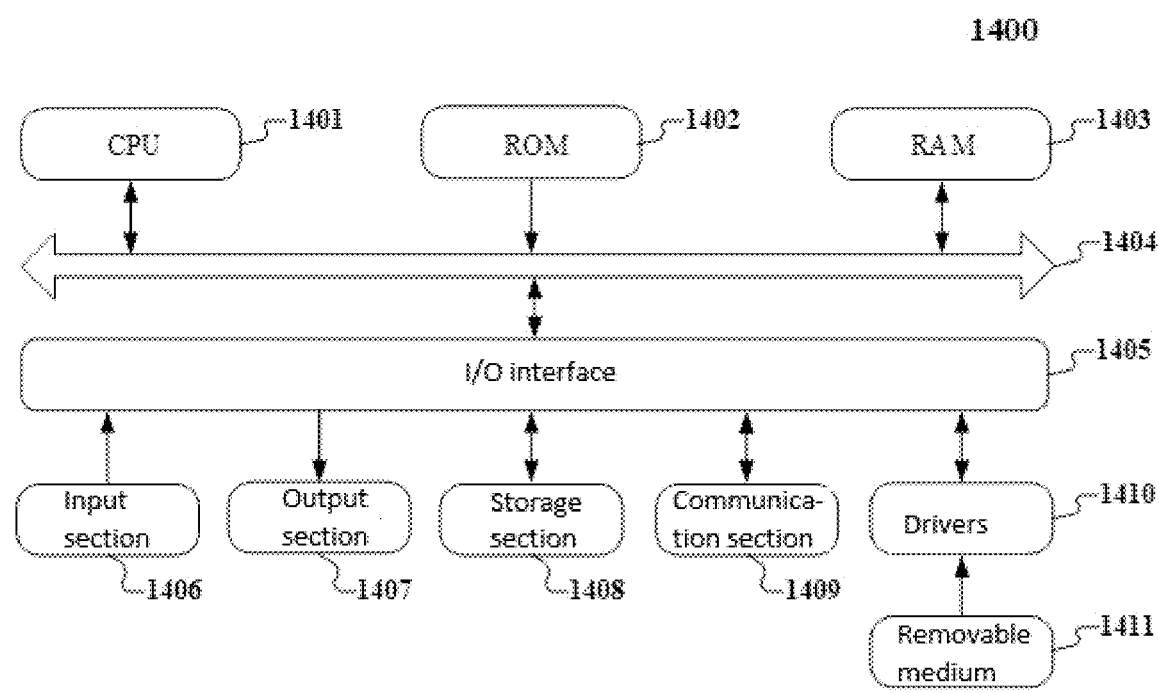
FIG. 14 is a schematic structural diagram of a computer system suitable for implementing a terminal device or a server according to an embodiment of the present invention.

Referring to FIG. 14 below, it shows a schematic structural diagram of a computer system 1400 suitable for implementing a terminal device or a server according to an embodiment of the present invention. The terminal device or server shown in FIG. 14 is only an example, and should not impose any limitations on the functions and scope of use of the embodiments of the present invention.

As shown in FIG. 14, the computer system 1400 includes a central processing unit (CPU) 1401 to perform various appropriate actions and processes according to a program stored in a read only memory (ROM) 1402 or a program in a random access memory (RAM) 1403 loaded from a storage section 1408. In the RAM 1403, various programs and data necessary for the operation of the system 1400 are also stored. The CPU 1401, the ROM 1402, and the RAM 1403 are connected to each other through a bus 1404. Input/output (I/O) interface 1405 is also connected to bus 1404.

The following components are connected to the I/O interface 1405: an input section 1406 including a keyboard, a mouse, etc; an output section 1407 including a cathode ray tube (CRT), a liquid crystal display (LCD), etc., and a speaker, etc.; a storage section 1408 including a hard disk, etc.; and a communication section 1409 including network interface cards such as LAN cards, modems, and the like. The communication section 1409 performs communication processing via a network such as the Internet. Drivers 1410 are also connected to I/O interface 1405 as needed. A removable medium 1411, such as a magnetic disk, an optical disk, a magneto-optical disk, a semiconductor memory, etc., is mounted on the drive 1410 as needed, so that a computer program read therefrom is installed into the storage section 1408 as needed.

In particular, the processes described above with reference to the flowcharts may be implemented as computer software programs in accordance with the disclosed embodiments of the present invention. For example, embodiments disclosed herein include a computer program product comprising a computer program carried on a computer-readable medium, the computer program containing program code for performing the method illustrated in the flowchart. In such an embodiment, the computer program may be downloaded and installed from the network via the communication port 1409, and/or installed from the removable medium 1411. When the computer program is executed by the central processing unit (CPU) 1401, the above-described functions defined in the system of the present invention are executed.

It should be noted that the computer-readable medium shown in the present invention may be a computer-readable signal medium or a computer-readable storage medium, or any combination of the above two. The computer-readable storage medium can be, for example, but not limited to, an electrical, magnetic, optical, electromagnetic, infrared, or semiconductor system, apparatus or device, or a combination of any of the above. More specific examples of computer readable storage media may include, but are not limited to, electrical connections with one or more wires, portable computer disks, hard disks, random access memory (RAM), read only memory (ROM), erasable programmable read only memory (EPROM or flash memory), optical fiber, portable compact disk read only memory (CD-ROM), optical storage devices, magnetic storage devices, or any suitable combination of the above. In the present invention, a computer-readable storage medium may be any tangible medium that contains or stores a program that can be used by or in conjunction with an instruction execution system, apparatus, or device. In the present invention, however, a computer-readable signal medium may include a data signal propagated in baseband or as part of a carrier wave, carrying computer-readable program code therein. Such propagated data signals may take a variety of forms, including but not limited to electromagnetic signals, optical signals, or any suitable combination of the foregoing. A computer-readable signal medium can also be any computer-readable medium other than a computer-readable storage medium that can transmit, propagate, or transport the program for use by or in connection with the instruction execution system, apparatus, or device. Program code embodied on a computer readable medium may be transmitted using any suitable medium including, but not limited to, wireless, wireline, optical fiber cable, RF, etc., or any suitable combination of the foregoing.

The flowchart and block diagrams in the figure illustrate the architecture, functionality, and operation of possible implementations of systems, methods and computer program products according to various embodiments of the present invention. In this regard, each block in the flowchart or block diagrams may represent a module, segment, or portion of code that contains one or more logical functions for implementing the specified function executable instructions. It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. It is also noted that each block of the block diagrams or flowchart illustrations, and combinations of blocks in the block diagrams or flowchart illustrations, can be implemented in special purpose hardware-based systems that perform the specified functions or operations, or can be implemented using a combination of dedicated hardware and computer instructions.

The units or modules involved in the embodiments of the present invention may be implemented in a software manner, and may also be implemented in a hardware manner. The described unit or module can also be set in the processor, for example, it can be described as: a processor includes a key signal recognition module, a Chinese character and phrase determination module, and a display module. Wherein, the names of these units or modules do not constitute limitations on the units or modules themselves, for example, the display module can also be described as "a module for displaying determined Chinese characters and/or phrases".

As another aspect, the present invention also provides a computer-readable medium, which may be included in the device described in the above embodiments; or may exist alone without being assembled into the device. The above-mentioned computer-readable medium carries one or more programs, and when the above-mentioned one or more programs are executed by a device, the device includes: identifying the received key signal; the result indicates that under the situation of Chinese character category code and/or phrase category code, determine the Chinese character and/or phrase represented by the Chinese character category code and/or phrase category code; wherein, Chinese character category code is corresponding to the basic components that Chinese character comprises. The combination of the component category code or the combination of the component category code and the distinguishing code is used to represent a Chinese character, and the distinguishing code is the corresponding coding of the distinguishing components obtained after the basic component is split; the phrase category code is the combination of all or part of the Chinese character category codes of each Chinese character, and is used to represent the phrase; the determined Chinese character and/or phrase are displayed.

According to the technical solution of the embodiment of the present invention, by identifying the received key signal, when the identification result of the received key signal is indicated as a Chinese character category code and/or a phrase category code, determine the recognized Chinese character represented by the Chinese character category code and/or phrase represented by the phrase category code; wherein, the Chinese character category code, for representing Chinese character, is the combination of the corresponding component category code of the basic components that Chinese characters comprise or the combination of the component category code and the distinguishing code, distinguishing code is the corresponding coding of the distinguishing component obtained after the basic component is split; the phrase category code is the combination of all or part of the Chinese character category codes of each Chinese character that the phrase includes, for representing the phrase; with the technical solution to display the determined Chinese character and/or the phrase, Chinese characters can be input only based on the component code, no need to combine other factors, the input is simple and convenient, solves the problem of cluttered characters, conforms to the wording, easy to remember and use, no special learning is required, and the entire input process is very naturally, there are not many rules, which reduces the difficulty of learning, the repetition rate is low, the input speed is fast, and there are no special requirements for pronunciation and equipment conditions.

The above-mentioned specific embodiments do not constitute a limitation on the protection scope of the present invention. It should be understood by those skilled in the art that various modifications, combinations, sub-combinations and substitutions may occur depending on design requirements and other factors. Any modifications, equivalent replacements and improvements made within the spirit and principle of the present invention shall be included within the protection scope of the present invention.

The invention claimed is:

1. A Chinese character input method, is characterized in that, comprises:
   identifying a received key position signal built on top of component category code which is an uppercase letter representing basic components with shapes similar to the letter's shape;
   in the case where the recognition result of the received key position signal is indicated as a Chinese character category code and/or a phrase category code, determining a Chinese character and/or phrase represented by the recognized Chinese character category code and/or the phrase category code; wherein, the Chinese character category code, used to represent the Chinese character, is a combination of component category code corresponding to the basic components included in the Chinese character or a combination of component category code and distinguishing code, which is a code corresponding to-distinguishing components obtained after a basic component is split; the phrase category code, for representing phrase, is a combination of all or part of the Chinese character category code of each Chinese character that phrase includes;
   Chinese characters and/or phrases are displayed,
   according to the key combination corresponding to the received key position signal, searching the Chinese character category code and the phrase category code that are consistent with the key combination in the Chinese character category input method table and the phrase category input method table, respectively, and determining the found Chinese characters and/or phrases represented by Chinese character category code and/or phrase category code, wherein, in the Chinese character category input method table, the correspondence between the Chinese character and the Chinese character category code is recorded, and in the phrase category input method table, the correspondence between the phrase and phrase category code is recorded.

2. The method according to claim 1, is characterized in that, described method also comprises: the Chinese character category code of each Chinese character is generated in advance, to obtain described Chinese character category input method table, wherein, the Chinese character category code of Chinese character is generated by the following manner:
   determining the number of components of a Chinese character to be generated Chinese character category code, where the number of components is the number of basic components included in the Chinese character, and the basic components of the Chinese character are ordered;
   if the number of components is 1, the unique basic component of the Chinese character being split to obtain a plurality of ordered distinguishing components, and according to the component category code of the unique basic component of the Chinese character and the corresponding optional distinguishing code of the first two distinguishing components, generating the Chinese character category code of described Chinese character;
   if the number of components is 2, the second basic component of the Chinese character being split to obtain a plurality of ordered distinguishing components, and according to the component category code of the two components and the optional distinguishing code of the first two distinguishing components, generating the Chinese character category code of the described Chinese character;
   if the number of components is greater than or equal to 3, the Chinese character category code of the Chinese character being generated according to the component category code of all basic components of the Chinese character.

3. The method as in claim 2, wherein the component category code is generated in the following manner:
   classifying all basic components according to their shapes, and obtaining multiple basic component shape categories;
   in each basic component shape category, a basic component that conforms to specified rule being used as the category guide component of the basic component shape category;
   according to shape similarity between the category guide components and the capital letters, a component category code corresponding to each basic component shape category being determined.

4. The method as in claim 3, wherein the method further comprises:
   according to the component category code corresponding to each basic component shape category, establishing a matching relationship between the basic component shape category and the key position;
   and, in response to the user's input instruction, displaying a virtual keyboard among a variety of virtual keyboards, where the virtual keyboard includes a plurality of virtual keys, the virtual keys are in one-to-one correspondence with the key positions, the virtual keys are used to display to the user some or all of the basic components in the basic component shape categories matching the corresponding key positions are displayed, the various virtual keyboards can be switched to each other based on the user's selection instruction, and the basic component shape categories correspond to the key positions one-to-one.

5. The method as in claim 4, wherein the virtual keys are used to show some or all of the basic components in the shape category of the basic components matched with the corresponding key positions according to the shape similarity between the basic components.

6. The method as in claim 3, wherein the distinguishing code is generated in the following manner:
   for each distinguishing component, determine whether it's a basic component;

if yes, then determine the distinguishing code of the distinguishing component corresponding to the component category code of the basic component;

if not, determine the similarity between the distinguishing component and all the basic components, and get the distinguishing code of the distinguishing component from the component category code of the closest basic component.

7. The method as in claim 6, wherein all basic components include basic components for generating simplified Chinese characters, traditional Chinese characters, Chinese characters in Japanese, and Chinese characters in Korean.

8. The method according to claim 1, wherein the method further comprises: pre-generating the phrase category code of each phrase to obtain the phrase category input method table, wherein the phrase category code of the phrase is generated in the following manner:

determine the Chinese character category code of each Chinese character that the phrase to be generated is comprised of;

according to the number of encodings of the Chinese character category code of each Chinese character in the set phrase category code, and according to the sequence of encoding in the Chinese character category code, extract the equal number of encoding from the Chinese character category code of each Chinese character included in the phrase; and according to the order combination of Chinese characters in the phrase, the phrase category code of the phrase is obtained; or, the Chinese character category code of each Chinese character that the phrase includes is combined to obtain the phrase category code of the phrase.

9. The method according to claim 1, characterized in that, comprising:

in the case where the recognition result of the received key position signal is indicated as a sentence category code, displaying the determined sentence; wherein, the set sentence category code consists of complete Chinese character category code and/or phrase category code of at least one continuous Chinese characters and/or phrases.

10. A keyboard for carrying out Chinese character input based on the Chinese character input method as in claim 1, characterized in that, comprising: matching with the key positions corresponding to the component category code and the distinguishing, the keyboard generates corresponding key position signals according to the user's key operation.

11. An electronic device, comprising:
one or more processors;
storage means for storing one or more programs, when executed by the one or more processors, cause the one or more processors to implement the method as in claim 1.

12. A non-transitory computer-readable medium on which a computer program is stored, characterized in that, when the program is executed by a processor, the method as in claim 1 is implemented.

13. A Chinese character input system, characterized in that, comprising:

a key position signal identification module being used to identify a received key position signal by checking whether the received key position signal is letter or not, built on top of component category code which is an uppercase letter representing basic components with shapes similar to the letter's shape;

Chinese character and phrase determination module, for in the situation that the identification result of the received key position signal is indicated as the Chinese character category code and/or the phrase category code, determining the Chinese character and/or phrase represented by the recognized Chinese character category code and/or the phrase category code; wherein, Chinese character category code, for representing Chinese character, is the combination of the corresponding component category code of the basic components that Chinese character comprises or the combination of component category code and distinguishing code, which is the corresponding code of the distinguishing components obtained after splitting the basic component; phrase category code, used to represent phrase, is the combination of all or part of Chinese character category codes of each Chinese character that phrase comprises;

the display module is used to display the determined Chinese characters and/or, phrases;

the modules may be implemented in a software manner, and may also be implemented in a hardware manner; the described modules can also be set in a processor, for example, it can be described as: a processor includes a key position signal recognition module, a Chinese character and phrase determination module, and a display module.

* * * * *